May 5, 1931.    F. AMIOT    1,803,494
HOLLOW FRAME ASSEMBLY
Filed Aug. 24, 1929    2 Sheets-Sheet 1

INVENTOR
FELIX AMIOT
BY
Briesen Schrenk
ATTORNEYS

Patented May 5, 1931

1,803,494

UNITED STATES PATENT OFFICE

FÉLIX AMIOT, OF COLOMBES, FRANCE, ASSIGNOR TO SOCIÉTÉ D'EMBOUTISSAGE ET DE CONSTRUCTIONS MÉCANIQUES, OF COLOMBES, FRANCE, A SOCIETY

HOLLOW-FRAME ASSEMBLY

Application filed August 24, 1929, Serial No. 388,161, and in Belgium December 20, 1928.

The present invention relates to hollow-frame assemblies and, more particularly, to those of the type suitable for forming aeroplane fuselages.

One of the objects of the invention is to provide a standardized form of assembly simplifying the machines and machine tools necessary to form a fuselage structure.

Other objects will appear in the course of the detailed description now to be given with reference to the accompanying drawings, in which:—

Figure 1:
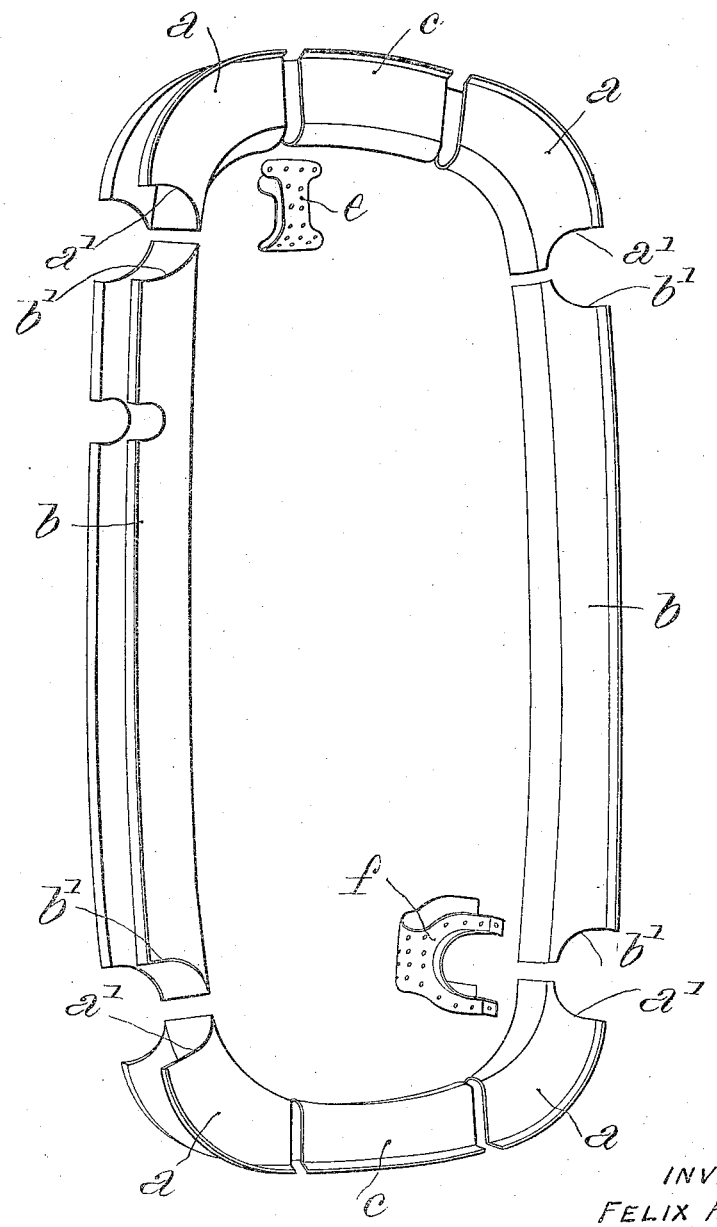
Fig. 1 is a perspective of the frame elements prior to assembly.
Figure 2:
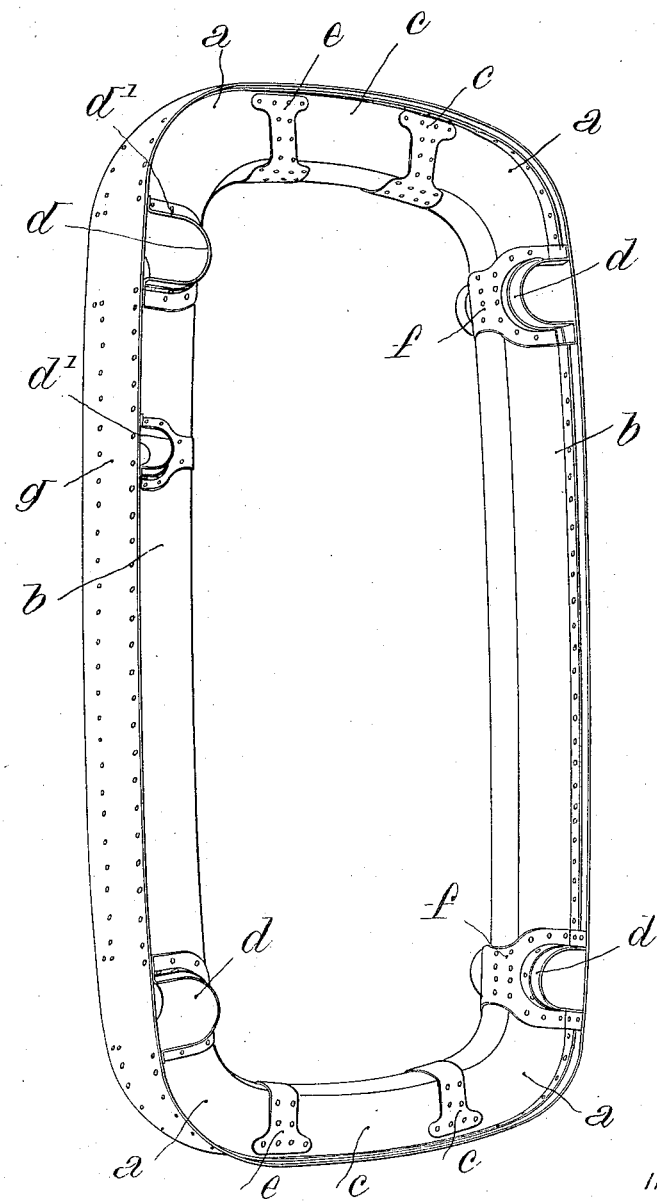
Fig. 2 is a similar perspective of the assembled frame.

Referring to the various figures of the drawings, there is shown a fuselage section composed of curved corner elements $a$, slightly arched longitudinal elements $b$, and transverse arched members $c$. Members $a$, $b$ and $c$ are preferably of U-section, members $a$ being all of the same curvature, and members $b$ and $c$ being either rectilinear (not shown) or arched outward along curves of long radius and (for the purpose of simplicity in manufacture) of identical curvature. Members $a$ and $b$ are provided with recesses $a^1$ and $b^1$ adapted to receive a longitudinal tie member $d$ passing through a series of fuselage sections to form the completed shell. Members $a$, $b$ and $c$ are tied together by appropriately formed identical elements $e$ and $f$ of U-section, the latter having a bifurcated form adapted to permit passage of longitudinal shells $d$. If desired, auxiliary openings may be formed in either members $b$ or $c$ (preferably $b$) to permit passage of auxiliary longitudinal shells $d^1$ passing through a series of frame sections.

The finished frame assembly is covered externally by a belt or strap-element $g$ and when joined to similar sections forms the complete fuselage.

From the foregoing, it will be seen that a fuselage may be made up of lateral elements $b$ and $c$ of identical curvature, standardized corner elements $a$, two standardized forms of tie elements $e$ and $f$, and suitable longitudinal elements $d$ and $d^1$, the resulting economy in manufacture being very considerable.

What I claim is:—

1. A frame unit assembly for aircraft fuselages comprising a pair of lateral elements of mutual similarity, a pair of end elements of mutual similarity, and a plurality of corner elements of mutual similarity, means for uniting said corner elements to said lateral and end elements, and means associated with the thus assembled frame unit adapted for connection with means for rigidly positioning each frame unit with a plurality of similarly assembled frame units in the completed fuselage.

2. A frame unit assembly for aircraft fuselages comprising a pair of lateral elements of mutual similarity, a pair of end elements of mutual similarity, and a plurality of corner elements of mutual similarity, means for uniting said corner elements to said lateral and end elements, means encompassing the entire outer periphery of the thus assembled frame unit for reinforcing the stability of the united structure, and means associated with the thus assembled frame unit adapted for connection with means for rigidly positioning each frame unit with a plurality of similarly assembled frame units in the completed fuselage.

3. A frame unit assembly for aircraft fuselages comprising a pair of lateral elements of mutual similarity, a pair of end elements of mutual similarity, and a plurality of corner elements of mutual similarity, means for uniting said corner elements to said lateral and end elements, each of said elements being U-shaped in cross-section, the open part of the U directed toward the outer periphery of the frame unit, and means associated with the thus assembled frame unit adapted for connection with means for rigidly positioning each frame unit with a plurality of similarly assembled frame units in the completed fuselage.

4. A frame unit assembly for aircraft fuselages comprising a pair of lateral elements of mutual similarity, a pair of end elements of mutual similarity, and a plurality of corner elements of mutual similarity, means for uniting said corner elements to said lateral and end elements, each of said elements being U-shaped in cross-section, the open part of the U directed toward the outer periphery of the frame unit, means extending over the open portion of the U-shaped elements, encompassing the entire outer periphery of the thus assembled frame unit for reinforcing the stability of the united structure, and means associated with the thus assembled frame unit adapted for connection with means for rigidly positioning each frame unit with a plurality of similarly assembled frame units in the completed fuselage.

5. A frame unit assembly for aircraft fuselages comprising a plurality of corner elements of mutual similarity, each having a recess-forming contour at one end thereof, a plurality of lateral elements of mutual similarity, and a plurality of end elements of mutual similarity, a plurality of said lateral elements having a recess-forming contour at at least one end thereof shaped and positioned to complement the recess-forming contour at the end of an adjacent corner element, means for connecting said corner elements to said lateral and end elements, the recesses formed at the junction between a corner element and a lateral element serving as means for connection with a longitudinal member extending through each of said recesses and adapted to connect a plurality of similarly assembled frame units.

6. A frame unit assembled for aircraft fuselages comprising a plurality of side elements of mutual similarity, a plurality of corner elements of mutual similarity, each corner element abutting endwise against an end of one of the side elements, means for uniting the several constituents of a frame unit into a rigid continuous oval structure and means associated with the thus assembled frame unit adapted for connection with means for rigidly positioning each frame unit with a plurality of similarly assembled frame units in the completed fuselage.

In testimony whereof I have signed this specification.

FÉLIX AMIOT.